A. P. WEBBER.
BALL AND SOCKET JOINT.

No. 174,990. Patented March 21, 1876.

UNITED STATES PATENT OFFICE.

ALANSON P. WEBBER, OF SARATOGA, ILLINOIS.

IMPROVEMENT IN BALL-AND-SOCKET JOINTS.

Specification forming part of Letters Patent No. 174,990, dated March 21, 1876; application filed February 2, 1876.

*To all whom it may concern:*

Be it known that I, ALANSON P. WEBBER, of Saratoga, Marshall county, State of Illinois, have invented a new and useful Improvement in Ball-and-Socket Joints, of which the following is a full description, reference being had to the accompanying drawings, in which—

Figure 1:
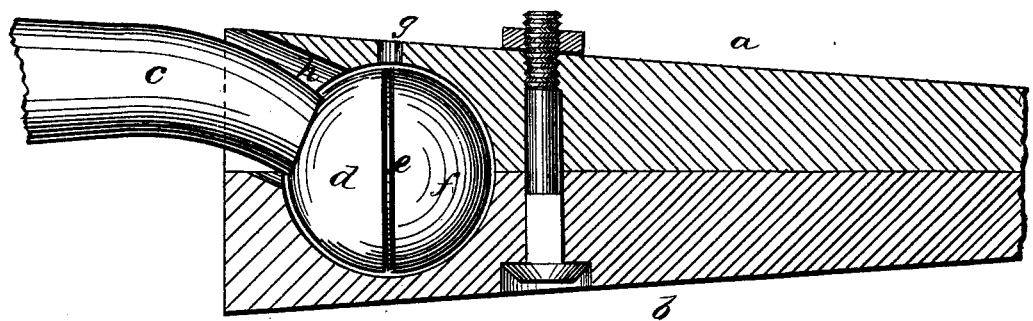
Figure 2:
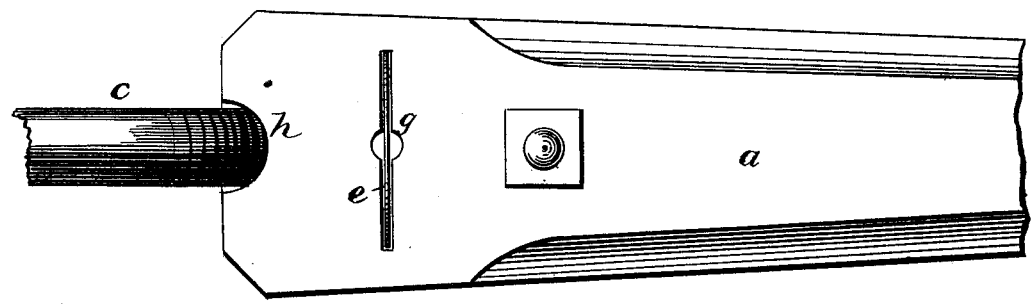

Figure 1 is a longitudinal section, and Fig. 2 a top or plan view.

Heretofore, no provision has been made for compensating the wear or taking up the slack of ball-and-socket joints, except that of bringing the upper and lower portions of the socket nearer together, which method makes the socket oblong, and does not provide for end wear, which is the principal portion of the wear, especially when this joint is used as a pitman-connection, such as are used for operating the sickles of harvesting, mowing, and other machines.

The object of my invention is to overcome these difficulties and to compensate the wear in all directions; and its nature consists in making the ball in sections and interposing a plate between the sections, as hereinafter described.

In the drawings, $a$ $b$ represent the upper and lower sections or plates used in forming the socket; $c$, the pitman bar or shaft; $d$, the portion of the ball made fast to or a part of the pitman; $e$, the interposed plates; $f$, the free or loose section of the ball, and $g$ an opening through the upper plate or section for inserting the compensating-plate $e$. $h$ is an opening for permitting the necessary play of the pitman. The plates $a$ $b$ are made in the usual or in any well known mode for forming a proper socket, and they may be screwed, bolted, or riveted together, as may be desired. When they are screwed or bolted together, the opening $g$ may be omitted, as in that case the socket may be opened for inserting the compensating-plates, but when riveted such an opening will be advisable, as then the plates $e$ can be inserted or withdrawn without opening the socket, and it will be found convenient even when the parts are put together by the use of screws, as the compensation can be made quicker and with less trouble, and it furnishes a convenient opening for oiling. A key or cover fitting into the opening $g$ is to be applied when necessary to keep out dirt and to keep the plate $e$ in place. The free section $f$ of the ball may be made originally of a size sufficient, with the other section or hemisphere $d$, to fill the socket, so that the ordinary wear may be had before the necessity for a compensating-plate occurs; and it will be found that, by reason of making the ball in two hemispheres, a greater wear will be obtained, as the flat surfaces will receive the thrust and go to position without all of the usual grinding effect. The compensating-plates may, however, be used in making the joint, and thereby avoid closeness in fitting. The plates $e$ are simple disks, and they may all be made of one thickness when thin metal, such as sheet-brass, tin, or sheet-iron, are used. The compensating for the wear may be accomplished by inserting additional plates between these hemispheres or sections; they may also be made of varying thicknesses, so as to use only single plates for such compensation.

By making the balls in sections, as shown, and by the use of compensating-plates, the ball can at all times be made to fill the socket, which not only prevents the unusual wear which occurs after the end play commences, but it also gives a steadier and more uniform motion to a sickle-bar or other instrument to which it may be attached or applied.

Having thus described my invention, what I claim as new, and desire to secure by Letters Patent, is—

1. In a ball-and-socket joint, the loose section $f$, operating conjointly with the section $d$, substantially as and for the purpose set forth.

2. In a ball-and-socket joint, the loose section $f$, operating conjointly with the section $d$, in combination with the compensating-plates or disks $e$, substantially as and for the purpose herein set forth.

ALANSON P. WEBBER.

Witnesses:
L. L. BOND,
O. W. BOND.